(12) United States Patent
Wengrovitz

(10) Patent No.: US 8,515,040 B2
(45) Date of Patent: Aug. 20, 2013

(54) GEOSPATIAL TELEPHONY SYSTEM

(75) Inventor: Michael S. Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 856 days.

(21) Appl. No.: 12/630,210

(22) Filed: Dec. 3, 2009

(65) Prior Publication Data
US 2011/0135077 A1    Jun. 9, 2011

(51) Int. Cl.
*H04M 3/42* (2006.01)
*H04M 11/04* (2006.01)
*H04W 24/00* (2009.01)

(52) U.S. Cl.
USPC ............ 379/202.01; 379/203.01; 379/207.12; 455/404.2; 455/414.2; 455/456.1; 455/456.2; 455/456.3

(58) Field of Classification Search
USPC ............. 379/202.01, 203.01, 204.01, 207.12; 455/456.3, 418, 416, 456.1, 456.2, 404.2, 455/414.2
See application file for complete search history.

(56) References Cited

U.S. PATENT DOCUMENTS

| | | | |
|---|---|---|---|
| 8,160,223 B2* | 4/2012 | Bennett et al. | 379/202.01 |
| 2006/0063539 A1* | 3/2006 | Beyer, Jr. | 455/456.3 |
| 2007/0033251 A1 | 2/2007 | Mandalia | |
| 2007/0081651 A1 | 4/2007 | Iyer | |
| 2009/0170492 A1* | 7/2009 | Lee | 455/418 |

FOREIGN PATENT DOCUMENTS
WO    20070055971 A2    5/2007

OTHER PUBLICATIONS
International Search Report and Written Opinion for PCT/US2010/057761 mailed Feb. 14, 2011 (9 pages).

* cited by examiner

*Primary Examiner* — Thjuan K Addy
(74) *Attorney, Agent, or Firm* — Garlick & Markison; Holly L. Rudnick

(57) ABSTRACT

A geospatial telephony system initiates conference calls between participants based on location of participants. For example, a node within the system can receive a location at which a first communication device is geospatially located and can enable a conference call to be initiated between the first communication device and at least one other communication device based on that location.

20 Claims, 13 Drawing Sheets

GEOSPATIAL TELEPHONY SYSTEM

BACKGROUND OF THE INVENTION

1. Technical Field of the Invention

The present invention relates in general to communication systems and in particular, to conferencing systems.

2. Description of Related Art

Rapid establishment of voice communication sessions is an important requirement in modern telephony systems. Today, with the advent of buddy lists and contact lists, a user can set up a call by simply pressing a single button and almost immediately receive the ring-back signal from the called party. However, such "speed dialing" still requires some manual initiation of the call, which can be tedious and error prone. In addition, a user must have some knowledge of the identity of the called party to initiate the call. If the user is only aware of the location of the called party, the user may have to first access a directory service before initiating the call or the user may simply not be able to establish a call at all with the desired called party.

Moreover, traditional "speed dialing" is only able to set up a voice conversation between two parties, the single caller and the single callee. In some cases, a voice conversation between several or perhaps even numerous parties may be desired. For example, in enterprise business scenarios, people typically work on teams, and therefore, there may be a business need for the rapid establishment of multiparty voice calls to meet each team's business objectives. First-responder, emergency and government applications may also require multiparty conference calls between members of a team. In addition, multiparty calls may also be desired in consumer applications.

Many service providers offer a voice conference call service in which a group of people can simultaneously communicate with each other. Typically, in such conferencing systems, each user is provided a 10 or more digit dial-in number plus a 7 or more digit access code to join the conference. After dialing the dial-in number, interacting with an Interactive Voice Response (IVR) system, and entering the additional access code digits, each of the multiple callers are bridged together so that they are able to speak to and hear each other within a conference room.

However, the process of joining each user separately to a conference call takes time. Furthermore, conventional conference bridge systems typically require coordination and scheduling between users. For example, the team must dial-in to the conference bridge at a certain, specified agreed-upon time. Thus, in addition to being inconvenient for all users due to entry of a large number of DTMF digits, conventional conference bridges do not facilitate spontaneous, ad-hoc voice conferences, which may be required in many enterprise, consumer and emergency communication scenarios.

For example, in some applications, especially those involving emergency response, telephone users at multiple geospatial locations must be notified of an event and then be placed in a conference call together to conduct a discussion, define an appropriate plan, etc. Existing solutions require an operator to first manually lookup various telephone numbers and then to manually place the parties together in the conference by providing a dial-in number or separately dialing each party. This can be a time-consuming and error-prone process.

Recently, some service providers have begun to offer a special multiparty voice service referred to as group push-to-talk. A user having a special type of cell phone, who also purchases a special group push-to-talk service from the service provider, can engage in a group push-to-talk voice communication by depressing a single key to speak to another user. However, group push-to-talk systems do not truly set up persistent conference calls. In the currently available push-to-talk service, only a single person can speak at any one time, and coordination or protocol is required in order to establish who is allowed to speak next, i.e. which single user is allowed to depress his/her group Push-to-Talk button on the special set.

Furthermore, the other user must also have the same special type of cell phone and same special service from the same service provider. Thus, a major limitation of this walkie-talkie-like system is that all users must have the same special cell phone devices and the same service provision. Other users having standard non-special cell phones, PBX phones and POTS phones cannot participate in the call. Currently, there are no known systems or solutions that address the need for automatically conferencing together parties with various types of communication devices based on their locations.

SUMMARY OF THE INVENTION

A node within a geospatial telephony system, in one embodiment of the present invention, allows for the automatic initiation of a conference call between conference participants based on the location of at least one of the participants. The node is coupled to a communication network and includes a memory for storing a geospatial telephony application and a processor operable to execute instructions of the geospatial telephony application to receive a location at which a first communication device is geospatially located and enable a conference call to be initiated between the first communication device and at least one other communication device based on the location.

In one embodiment, the system is a static geospatial telephony system in which the location of the first communication device is provided by a second communication device and the node is further operable to access a database to retrieve a telephone number of record of the first communication device. For example, the second communication device can include a graphical user interface for displaying a map to a user to enable the user to select the location from the map.

A single location can be entered or, in other embodiments, multiple locations can be entered, each having a different communication device geospatially positioned thereat. If multiple locations are entered, the conference call is initiated between all of the communication devices. In a further embodiment, the location can include a geographic region and the node can access the database to retrieve multiple telephone numbers of record for multiple communication devices that are geospatially positioned within the geographic region for the conference call. In addition, the location can further include a filter and the node can select specific ones of the multiple telephone numbers of record based on the filter for the conference call.

In another embodiment, the system is a dynamic geospatial telephony system in which the location of the first communication device is provided by the first communication device and the node is further operable to determine an identity of at least one other communication device based on the location. For example, the memory can further store a conference policy that indicates that the conference call is to be initiated with at least one other communication device when the first communication device is geospatially positioned at the location. In addition, the first communication device can include a Global Positioning System (GPS) device operable to determine the location of the first communication device.

In a first exemplary embodiment, the node is one of the first communication device and the at least one other communication device. In a second exemplary embodiment, the node is a switch within the communication network and coupled to a conference server to facilitate the conference call between the first communication device and the at least one other communication device. In a third exemplary embodiment, the node is a web server hosting a website controlled by the processor. For example, in a static geospatial telephony system, the processor can be operable to push a web page to the at least one other communication device to enable a user of the at least one other communication device to enter the location. In a fourth exemplary embodiment, the node is a watcher of the first communication device and is coupled to a presence server to receive the location of the first communication device as presence information thereof.

In another embodiment of the present invention, a geospatial telephony system, allows for the automatic initiation of a conference call between conference participants based on the location of at least one of the participants. The system includes a node coupled to a communication network to receive a location at which a first communication device is geospatially located and enable a conference call to be initiated between the first communication device and at least one other communication device based on the location. The system further includes a conference server including a conference room operable to manage the conference call. The conference server creates the conference room and connects the first communication device and the at least one other communication device together in the conference call via the conference room.

In one embodiment, the system is a static geospatial telephony system and includes a database maintaining a list of locations and telephone numbers of record for the locations. The location of the first communication device is provided by a second communication device and the node accesses the database to retrieve the telephone number of record of the first communication device based on the location.

In another embodiment, the geospatial telephony system is a dynamic telephony system and the location is provided by the first communication device. In this embodiment, the node is further operable to determine an identity of the at least one other communication device using a conference policy that indicates that the conference call is to be initiated with the at least one other communication device when the first communication device is geospatially positioned at the location.

In a further embodiment, the conference server further creates a temporary conference room to connect the first communication device and the at least one other communication device to a recorder to play a recorded message that prompts each of the first communication device and the at least one other communication device to opt-in to join the conference call.

In yet a further embodiment, the system includes a call center coupled to a plurality of call center agents, in which one of the call center agents is associated with the first communication device or the at least one other communication device.

In still a further embodiment, the system includes a presence server coupled to the communication network and operable to register the node as a watcher of the first communication device, receive the location of the first communication device as presence information thereof and provide the presence information of the first communication device to the node.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
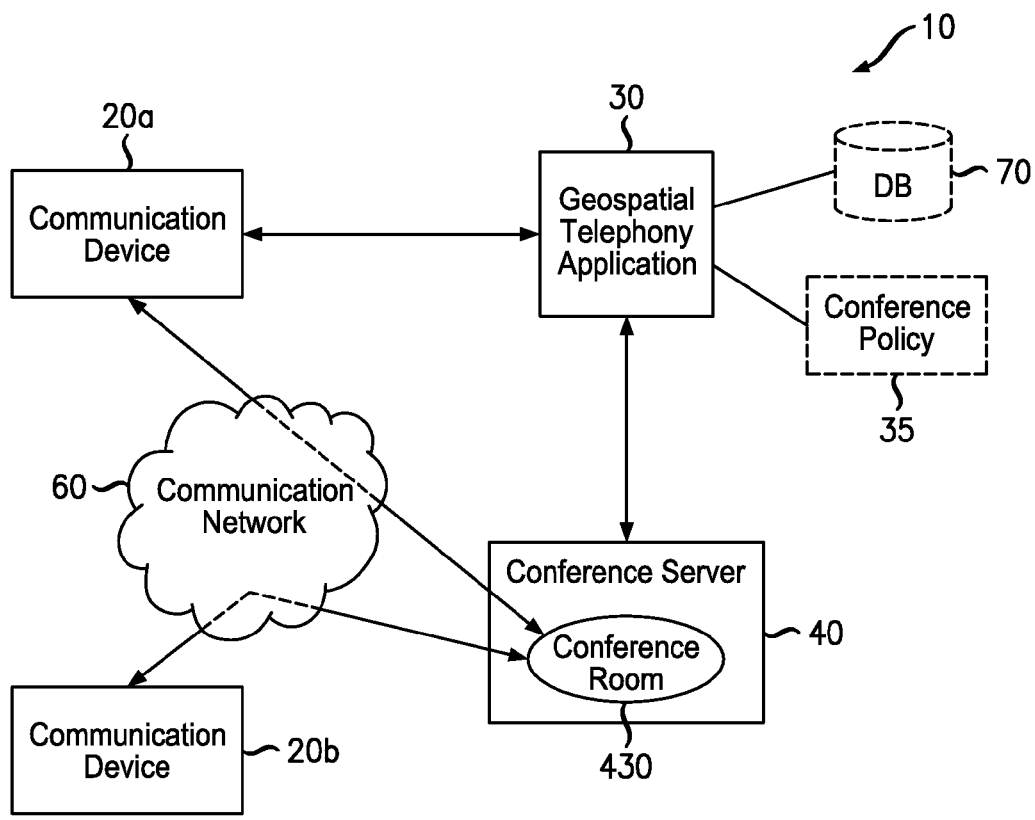
FIG. 1 illustrates an exemplary geospatial telephony system, in accordance with embodiments of the present invention.

FIG. 1 illustrates an exemplary geospatial telephony system 10, in accordance with embodiments of the present invention. The geospatial telephony system 10 allows for the automatic initiation of a conference call between conference participants based on the location of at least one of the participants. Thus, the geospatial telephony system 10 implements a "call-by-location" feature.

For example, the geospatial telephony system 10 can enable a conference call to be automatically established between a first communication device 20a and a second communication device 20b based on the location of the first or second communication device 20a or 20b. By way of example, but not limitation, such communication devices 30 can include plain old telephone service (POTS) phones, cellular/mobile telephones, Session Initiation Protocol (SIP) phones, desktop phones, PBX phones, desktop computers, laptop computers, Portable Digital Assistants (PDAs) and Land Mobile Radio (LMR) devices (i.e., two-way radio devices).

The geospatial telephony system 10 includes a voice/data conference server 40 providing one or more conference rooms 50 for conference calls. Each conference room 50 is associated with a particular conference call, and is responsible for establishing the different conference legs to/from each of the conference participants (devices 20a and 20b) for the conference call and for managing the leg states of the conference legs. For example, the conference room 50 can establish a respective conference leg for each voice and data connection to the conference call, add additional voice and/or data conference legs to the conference call, drop one or more voice and/or data conference legs and mute or un-mute one or more of the voice conference legs.

Although not specifically shown in FIG. 1, multiple conference rooms 50 can exist in parallel. However, voice between conference rooms 50 is not mixed (unless directed by an operator), so that participants in one conference room 50 do not unintentionally hear participants in another conference room 50.

In one embodiment, the conference server 40 creates and manages the conference rooms 50 in specialized conferencing hardware or circuitry. In another embodiment, the conference server 40 creates and manages and conference rooms 50 using a combination of specialized conferencing hardware or circuitry, software and/or firmware. In yet another embodiment, the conference server 40 executes software routines on a standard, general-purpose personal computer (PC) to create and manage the conference rooms 50. In this embodiment, the conference server 40 is designed to enable additional separate general-purpose PCs to be stacked together for increased system scalability and redundancy. As such, no special hardware or circuitry, such as DSP chips and boards and high speed audio busses, is required, thereby minimizing manufacturing costs of the conference server 40.

The telephony connections for exchanging media between the communication devices 20a and 20b and the conference server 40 are routed via communication network 60. The communication network 60 can be, for example, an Internet Protocol (IP) or other packet-based network that utilizes packet-switched connections, such as Voice over Internet Protocol (VoIP), e.g., Session Initiation Protocol (SIP), a circuit-switched network that utilizes circuit-switched connections, such as Integrated Services Digital Network (ISDN), e.g., Primary Rate Interface (PRI) trunks, a mobile network, e.g., Public Land Mobile Network (PLMN) or Wireless Local Area Network (WLAN) or any other network or combination of networks. For example, the conference server 40 can exchange SIP commands and VoIP Real Time Protocol (RTP) media with an external SIP-to-PSTN gateway, SIP phones, and other SIP devices, such as SIP-to-Radio converters, SIP overhead speakers, etc. The conference server 40 can also incorporate, or interface to, an internal or external T1/E1 telephone trunk card for the exchange of voice signaling and media via the Public Switched Telephone Network (PSTN) with conventional POTS, PBX, and cellular telephones.

The geospatial telephony system 10 also includes a geospatial telephony application 30. The geospatial telephony application 30 communicates with one or more users (i.e., communication device 20a) to receive a location at which one or more communication devices (i.e., communication device 20a and/or 20b) are geospatially located. In addition, the geospatial telephony application 30 is coupled to the conference server 40 to enable a conference call to be initiated between communication devices 20a and 20b based on the location. For example, the geospatial telephony application 30 can issue suitable Application Programming Interface (API) commands to the conference server 40 to create a conference room 50 for a conference call, dial-out to users to join the users to the conference room 50, mute users, etc.

In one embodiment, the geospatial telephony application 30 is a software program installed on the conference server 40. In another embodiment, the geospatial telephony application is a software program installed on a network node, such as a PSTN switch, PBX, central office, mobile switching center (MSC), Wireless Access Point (WAP) or other node. In yet another embodiment, the geospatial telephony application 30 is a software program installed on a communication device 20a or 20b. In still another embodiment, the geospatial telephony application is a software program installed on a web server. In other embodiments, the geospatial telephony application 30 can be distributed among multiple nodes, including the conference server 40. For example, the geospatial telephony application 30 can be distributed between communication device 20a and conference server 40, communication device 20a and another node within the network (i.e., a switch and/or web server) or the conference server 40 and a node within the network (i.e., a switch and/or web server).

In an exemplary embodiment, the geospatial telephony system 10 is a static geospatial telephony system in which the location of one or more communication devices 20a and/or 20b changes infrequently (i.e., the communication devices do not move significantly). In this embodiment, the geospatial telephony application 30 enables a user to select one or more desired locations at which communication devices are present for a conference call. Upon receiving the desired location(s), the geospatial telephony application 30 accesses a database 70 to retrieve the telephone numbers-of-record for each of the desired locations and issues commands to the conference server 40 to create a conference room 50 for a conference call between the communication devices associated with the retrieved telephone numbers-of-record. Once the communication devices accept the invitation to join the conference call, the conference room 50 establishes a separate conference leg for each voice and data connection for each communication device to the conference call. For example, in a simple embodiment, an operator can select multiple locations on a map (i.e., schools, police station, mayor's office, etc.), then each telephone of record (TOR) is looked up from the database 70, and the multiple telephones are automatically dialed and conferenced together.

In an exemplary operation, a map can be provided by the geospatial telephony application 30 as a user interface on communication device 20a to enable a user of communication device 20a to specify the location (i.e., latitude and longitude, cross roads, region, etc.) at which communication device 20b is present. The map can be pushed to communication device 20a from the geospatial telephony application 30 through network 60 or the map can be stored internally on communication device 20a and accessed by geospatial telephony application 30 installed on communication device 20a. Upon receiving the location of communication device 20b, the geospatial telephony application 30 can retrieve the telephone number-of-record of communication device 20b from the database 70 and issue a command to the conference server 40 to create a conference room 50 and establish a conference call between communication devices 20a and 20b via conference room 50 and communication network 60. In response, the conference server 40 can automatically establish a conference leg between communication device 20a and conference room 50 (i.e., use the current network connections between communication device 20a and conference server 40 to create a voice/data connection) and dial-out to communication device 20b to invite communication device 20b to join the conference call and establish a conference leg between communication device 20b and conference room 50.

In another exemplary embodiment, the geospatial telephony system 10 is a dynamic geospatial telephony system in which the location of one or more communication devices 20a and/or 20b changes dynamically. In this embodiment, the geospatial telephony application 30 uses a current location (i.e., a real-time Global Positioning System (GPS) location indicating latitude and longitude, cross roads, region, etc.) of one communication device, e.g., communication device 20a, to determine whether a conference call should be established. In particular, the geospatial telephony application 30 accesses a conference policy 35 to determine whether a conference call is required based on the location of communication device 20a. The conference policy can be associated with communication device 20a or can be associated with a particular location and/or region.

The conference policy 35 can include, for example, a predefined list of users that are to be included in a particular conference call when communication device 20a is at a particular location. To initiate the conference call, the geospatial telephony application 30 provides the list of users for the particular conference call to the conference server 40 to enable the conference server 40 to create the conference room 50 for the conference call and dial-out to the users in the list to attempt to join these users to the conference call. Once the users optionally accept the invitation to join the conference call, the conference room 50 establishes a separate conference leg for each voice and data connection for each user to the conference call.

The list of users in the conference policy 35 can include a single telephone number for each conference participant or multiple telephone numbers for each conference participant. For example, the conference server 40 can try a first number for a participant, such as his/her cell phone, and if the participant does not answer at the first number, then a second number, such as an office phone and then perhaps a third number, such as a home phone, in an attempt to reach that conference participant. Instead of including telephone numbers, the list can include usernames of users that are to be called for a particular conference call. The geospatial telephony application 30 can also query a database (not shown) that maps the usernames to pre-registered telephone numbers, and then issue a dial-by-number command to the conference server 40. Each user can manage his/her username to telephone number mapping.

In an exemplary operation of the dynamic geospatial telephony system 10, the geospatial telephony application 30 can receive the current location of communication device 20a from communication device 20a or from another network node and access a conference policy 35 that indicates whether a conference call involving communication device 20a and at least one other communication device, e.g., communication device 20b, should be established. Upon determining that a conference call should be established between communication device 20a and communication device 20b as a result of the current location of communication device 20a, the geospatial telephony application 30 can issue a command to the conference server 40 to create a conference room 50 and establish a conference call between communication devices 20a and 20b via conference room 50 and communication network 60. In response, the conference server 40 can automatically establish a conference leg between communication device 20a and conference room 50 (i.e., use the current network connections between communication device 20a and conference server 40 to create a voice/data connection) and dial-out to communication device 20b to invite communication device 20b to join the conference call and establish a conference leg between communication device 20b and conference room 50.

Figure 2:
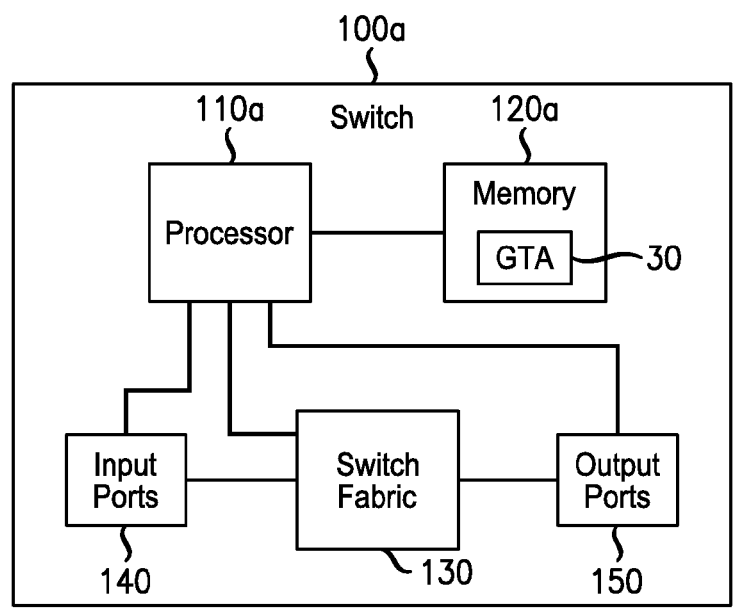
FIGS. 2-5 illustrate exemplary implementations of a geospatial telephony application throughout the system, in accordance with embodiments of the present invention.

Referring now to FIGS. 2-5, exemplary implementations of the geospatial telephony application (GTA) 30 in various nodes 100 throughout the system are illustrated. In FIG. 2, the GTA 30 is implemented within a network switch 100a. By way of example, but not limitation, the switch 100a can be a central office, Public Switched Telephone Network (PSTN) switch, mobile switching center (MSC), private branch exchange (PBX), Local Area Network (LAN) switch, Wireless Access Point (WAP), Asynchronous Transfer Mode (ATM) switch or any other type of network switch.

The switch 100a includes a processor 110a, a memory 120a, switch fabric 130, input ports 140 and output ports 150. The memory 120a maintains the GTA 30, and the processor 110a is coupled to the memory 120a to execute instructions of the GTA 30. For example, in embodiments in which the geospatial telephony system is static, the processor 110a can execute instructions of the GTA 30 to process a request for a map from a communication device coupled to the switch 100a, push a map to a communication device, receive a location from a communication device, retrieve a telephone number of record for the location from a database internal or external to the switch 100a and/or generate commands to a conference server to initiate a conference call with the communication device having the telephone number of record and another party (e.g., the communication device that transmitted the location).

In an exemplary operation, the switch 100a can receive a request from a user operating a communication device coupled to the switch 100a to initiate a conference call between the communication device and one more other communication devices positioned at one or more locations. The request can include the locations at which the other communication devices are known to be or assumed to be. The processor 110a can initialize the GTA 30 to process the request by accessing a database stored internally within the switch 100a or located remote from the switch 100a to retrieve the telephone number(s) of record for the desired location(s). Upon receiving the telephone number(s) of record, the processor 110a can generate commands to a conference server within the switch 100a or external to the switch 100a to initiate a conference call between the communication devices. For example, the processor 110a can provide the retrieved telephone number(s) of record to the conference server and connect the communication device that sent the request to the conference server for the conference call.

As another example, in embodiments in which the geospatial telephony system is dynamic, the processor 110a can execute instructions of the GTA 30 to request/receive a location of a mobile communication device, access a conference policy to determine whether a conference call should be established as a result of the location of the mobile communication device and/or generate commands to a conference server to initiate such a conference call. In an exemplary operation, the switch 100a is coupled to a cellular telephone to receive a current location of the cellular telephone. The location can be determined, for example, by a GPS receiving device within the cellular telephone. The location can be automatically transmitted by the cellular telephone at regular intervals directly to the switch 100a or to another node within the network, which then provides the location to the switch 100a. For example, the cellular telephone can provide it's location to a web server which the switch 100a can access, or a presence server which can then transmit the location to the switch 100a.

Upon receiving the location of the cellular telephone, the switch 100a initializes the GTA 30 to access a conference policy stored within the switch 100a or external to the switch 100a (e.g., within a conference server, external database or other network node) to determine whether the location of the cellular telephone indicates that a conference call should be established. For example, the conference policy may indicate that when the cellular telephone is at a particular geographic location (latitude, longitude) or within a particular region (e.g., defined by a radius surrounding a particular latitude, longitude), that a conference call between the cellular telephone and another party or parties should be established. If the conference policy indicates that a conference call should be established, the processor 110a generates commands to the conference server (internal or external) to initiate a conference call between the communication devices. For example, the processor 110a can provide the telephone number(s) of the other communication devices to be brought in on the conference call to the conference server and connect the cellular telephone to the conference server for the conference call.

The switch fabric 130 includes a combination of hardware and software responsible for moving data coming into to the switch 100a via one of the input ports 140 to the correct output port 150 for transmission of the data to the next node in the network. Thus, the switch fabric 130 includes the switching units (individual boxes) in the switch 100a, the integrated circuits that they contain, and the programming that allows switching paths to be controlled. For example, the switch fabric 130 can operate to connect a communication device coupled to the switch 100a to the conference server in order to complete a conference call involving the communication device.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein. In addition, as used herein, the term "memory" includes any type of data storage device, including but not limited to, a hard drive, random access memory (RAM), read only memory (ROM), flash memory, compact disc, floppy disc, ZIP® or disc drive, tape drive, database or other type of storage device or storage medium.

Figure 3:
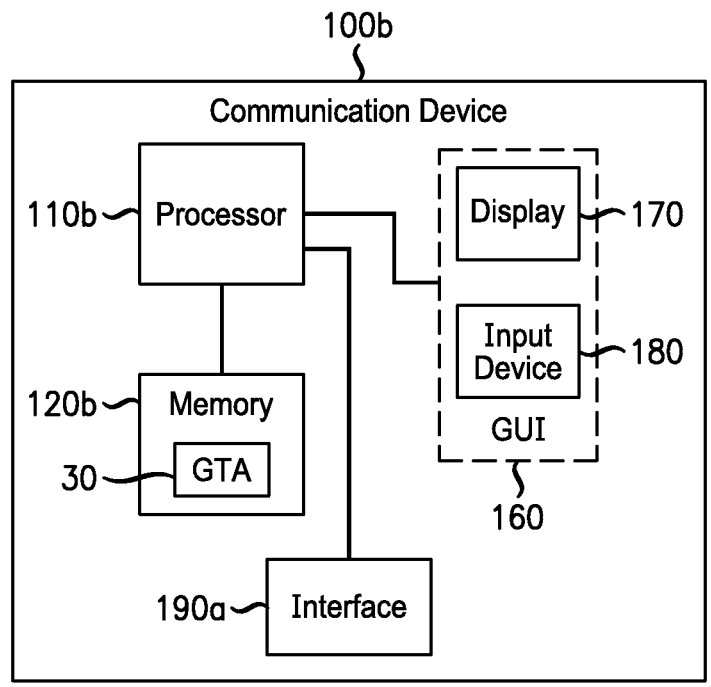

In FIG. 3, the GTA 30 is implemented within a communication device 100b, such as communication device 20a shown in FIG. 1. Thus, communication device 100b can be, for example, a personal computer, laptop computer, VoIP phone, plain old telephone service (POTS) phone, cellular/mobile telephone, Session Initiation Protocol (SIP) phone, desktop phone, PBX phone, Portable Digital Assistant (PDA) or Land Mobile Radio (LMR) device.

The communication device 100b includes a processor 110b, memory 120b, graphical user interface (GUI) 160 and network interface 190a. The network interface 190a is coupled to a communication network, as shown in FIG. 1, to enable the communication device 100b to communicate with network nodes and other communication devices. For example, the network interface 190a can be connected to transmit and receive media (e.g., circuit-switched voice, VoIP media streams and/or data) to and from a network switch. Thus, the network interface 190a can include one or more of a packet-switched interface for transmitting VoIP media, a circuit-switched interface for transmitted circuit-switched voice or a radio interface for transmitting media over an air interface. The GUI 160 includes a display 170 and an input device 180. By way of example, but not limitation, the input device 180 can include one or more of a mouse, keyboard, keypad, light pen, stylus, touch screen or other type of user input device.

The memory 120b maintains the GTA 30, and the processor 110b is coupled to the memory 120b to execute instructions of the GTA 30. For example, in embodiments in which the geospatial telephony system is static, the processor 110b can execute instructions of the GTA 30 to process a request for a map from a user received via input device 180, request/receive a map from a network node via network interface 190a, display a map to a user via display 170, receive a location on the map from a user via input device 180, retrieve a telephone number of record for the location via network interface 190a and/or generate commands to a conference server to initiate a conference call with the communication device having the telephone number of record and another party (e.g., the communication device 100b) via network interface 190a.

In an exemplary operation, the GTA 30 can display to a user of the communication device 100b a map from which the user can select one or more locations or provide a prompt (e.g., voice and/or data entry prompt) for the user to enter one or more locations (e.g., latitude and longitude coordinates, street address, cross roads, designated regions, etc.) via the GUI 160. In response to the user entering one or more locations, the GTA 30 can access either internal memory 120b or a remote database storing a list of locations and associated telephone numbers of record to retrieve the telephone number(s) of record for the entered location(s). In response to receiving the telephone number(s) of record, the GTA 30 can generate commands to a conference server to initiate a conference call between the communication device 100b and other communication device(s) having the retrieved telephone number(s) of record.

As another example, in embodiments in which the geospatial telephony system is dynamic, the processor 110b can execute instructions of the GTA 30 to determine a current location of the communication device 100b, transmit the current location of the communication device 100b to a network node via network interface 190a, access a conference policy to determine whether a conference call should be established as a result of the location of the communication device 110b and/or generate commands to a conference server to initiate such a conference call.

In an exemplary operation, the communication device 100b is a cellular telephone that is operable to determine its location (i.e., latitude and longitude coordinates), using, for example, a GPS receiving device (not shown) or other positioning techniques, such as triangulation based on cell phone network tower locations. The telephone's location can be determined at regular intervals or upon a request from a user or the network. Upon determining its location, the processor 110b executes instructions of the GTA 30 to access a conference policy stored within the cellular telephone 100b or within the network (e.g., within a conference server, switch, web server, external database or other network node) to determine whether the location of the cellular telephone indicates that a conference call should be established. If the conference policy indicates that a conference call should be established, the processor 110b generates commands to the conference server via network interface 190a to initiate a conference call between the communication devices. For example, the processor 110b can provide its telephone number and the telephone number(s) of the other communication devices to be brought in on the conference call to the conference server.

Figure 4:
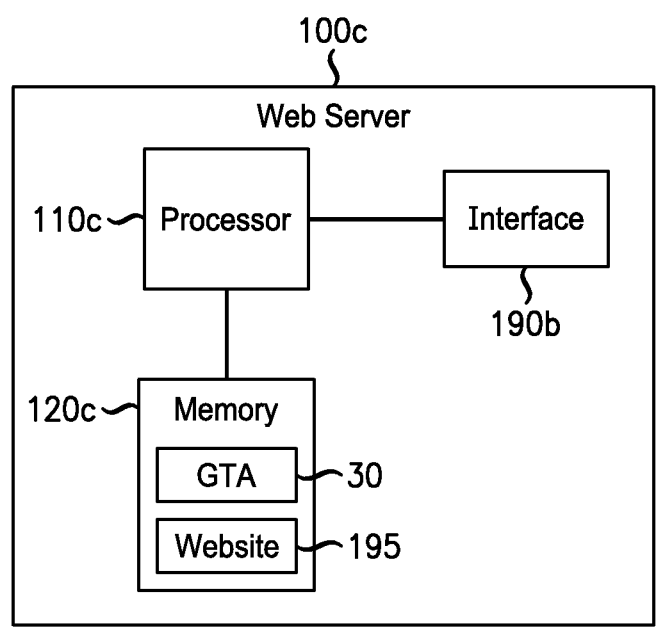

In FIG. 4, the GTA 30 is implemented within a web server based architecture 100c. The web server architecture 100c includes a processor 110c, memory 120c, and network interface 190b. The network interface 190b is coupled to a communication network, as shown in FIG. 1, to enable the web server 100c to communicate with network nodes and communication devices. For example, the network interface 190b can be connected to transmit and receive media (e.g., circuit-switched voice, VoIP media streams and/or data) to and from user communication devices and other network nodes. Thus, the network interface 190b can include one or more of a packet-switched I/F for transmitting VoIP media, or a circuit-switched I/F for transmitted circuit-switched voice.

The memory 120c maintains a web site 195 hosted by the web server 100c and the GTA 30. The processor 110c is coupled to the memory 120c to execute instructions of the GTA 30. For example, in embodiments in which the geospatial telephony system is static, the processor 110c can execute instructions of the GTA 30 to process a request for a map from a communication device or other network node received via network interface 190b, transmit a map to a communication device or other network node via network interface 190b, receive a location from a communication device or other network node via network interface 190b, retrieve a telephone number of record for the location via network interface 190b and/or generate commands to a conference server to initiate a conference call with the communication device having the telephone number of record and another party via network interface 190b.

In an exemplary operation, the web server 100c can host a website 195 associated with the GTA 30 to enable users to access the services provided by the GTA 30. For example, the web server 100c can push one or more web pages of the website 195 to a user to allow the user to request a map of a particular region. In response to the received request, the website 195 and GTA 30 can push a particular map to the user via network interface 190b. Thereafter, the user can select one or more locations on the map and transmit the location(s) to the web server 100c. In response to receiving the requested location(s), the GTA 30 can access a database stored internally within the web server 100c or located remote from the web server 100c to retrieve the telephone number(s) of record for the desired location(s). Upon receiving the telephone number(s) of record, the processor 110c can execute instructions of the GTA 30 to generate commands to a conference server to initiate a conference call. For example, the processor 110c can provide the retrieved telephone number(s) of record and the telephone number of the user to the conference server.

As another example, in embodiments in which the geospatial telephony system is dynamic, the processor 110c can execute instructions of the GTA 30 to receive a current location of a communication device, access a conference policy to determine whether a conference call should be established as a result of the location of the communication device and/or generate commands to a conference server to initiate such a conference call.

In an exemplary operation, the web server 100c can host a website 195 associated with the GTA 30 to enable a mobile communication device to access the services provided by the GTA 30. For example, the web server 100c can push one or more web pages of the website 195 to the mobile communication device to allow the mobile communication device to transmit its location to the web server 100c. In response to receiving the location, the processor 110c can execute instructions of the GTA 30 to access a conference policy stored within the web server 100c or external to the web server 100c to determine whether the location of the cellular telephone indicates that a conference call should be established. If the conference policy indicates that a conference call should be established, the processor 110c generates commands to the conference server to initiate a conference call. For example, the processor 110c can provide the telephone number of the mobile communication device and the telephone numbers of other communication devices to be brought in on the conference call to the conference server.

Figure 5:
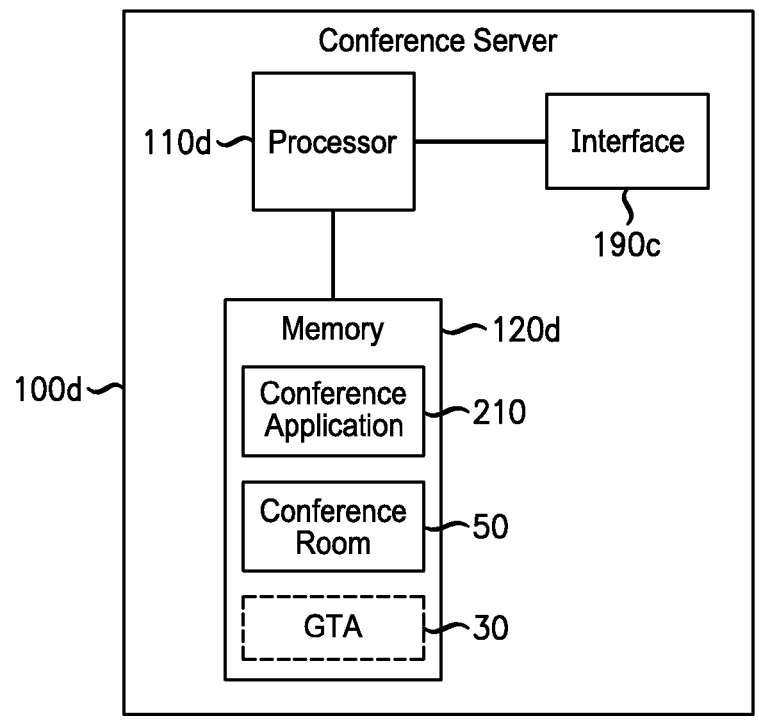

In FIG. 5, the GTA 30 is implemented within a conference server 100d, such as conference server 40 shown in FIG. 1. The conference server 100d includes a processor 110d, memory 120d, and network interface 190c. The network interface 190c is coupled to a communication network, as shown in FIG. 1, to enable the conference server 100d to communicate with network nodes and communication devices. For example, the network interface 190c can be connected to transmit and receive media (e.g., circuit-switched voice, VoIP media streams and/or data) to and from user communication devices and other network nodes. Thus, the network interface 190c can include one or more of a packet-switched interface for transmitting VoIP media, or a circuit-switched interface for transmitted circuit-switched voice.

The memory 120d maintains a conference application 210 and the GTA 30. In addition, the memory 120d can further include one or more conference rooms 50, each associated with a different conference call. The processor 110d is coupled to the memory 120d to execute instructions of the conference application 210 and GTA 30. For example, in embodiments in which the geospatial telephony system is static, the processor 110d can execute instructions of the GTA 30 to process a request for a map from a communication device or other network node received via network interface 190c, transmit a map to a communication device or other network node via network interface 190c, receive a location from a communication device or other network node via network interface 190c, retrieve a telephone number of record for the location via network interface 190c and/or initiate a conference call with the communication device having the telephone number of record and another party via network interface 190c.

In an exemplary operation, the conference server 100d can receive an incoming call from a communication device and provide an Application Program Interface (API) to the communication device to enable the communication device to access the services provided by the GTA 30. For example, the processor 110d can execute instructions of the GTA 30 to receive a request for a map of a particular region from a communication device, and in response to the received request, push a particular map to the communication device via network interface 190c. Thereafter, the communication device can transmit one or more selected location(s) on the map to the conference server 100d. In response to receiving the requested location(s), the processor 110d can execute instructions of the GTA 30 to access a database stored internally within the conference server 100d or located remote from the conference server 100d to retrieve the telephone number(s) of record for the desired location(s). Upon receiving the telephone number(s) of record, the processor 110d can execute instructions of the GTA 30 to initiate the conference application 210 and create a conference room 50 for a conference call. For example, the processor 110d can provide the retrieved telephone number(s) of record and the telephone number of the communication device to the conference application 210 and issue one or commands/instructions to the conference application 210 to dial-out to the telephone numbers provided.

As another example, in embodiments in which the geospatial telephony system is dynamic, the processor 110d can execute instructions of the GTA 30 to receive a current location of a communication device, access a conference policy to determine whether a conference call should be established as a result of the location of the communication device and/or generate commands to the conference application 210 to initiate such a conference call.

In an exemplary operation, the conference server 100d can provide an Application Program Interface (API) to enable a mobile communication device to access the services provided by the GTA 30. For example, the processor 110d can enable the mobile communication device to transmit its location to the conference server 100*d*. In response to receiving the location, the processor 110*d* can execute instructions of the GTA 30 to access a conference policy stored within the conference server 100*d* or external to the web server 100*d* to determine whether the location of the cellular telephone indicates that a conference call should be established. If the conference policy indicates that a conference call should be established, the processor 110*d* can generate commands to the conference application 210 to initiate a conference call. For example, the processor 110*d* can provide the telephone number of the mobile communication device and the telephone numbers of other communication devices to be brought in on the conference call to the conference application 210.

Regardless of whether the GTA 30 is included within the conference server 100*d* or whether the geospatial telephony system is dynamic or static, upon receiving commands to initiate a conference call involving two or more conference participants, the conference application 210 creates a conference room 50 for the conference call and dials-out to the conference participants. In one embodiment, the conference application 210 can dial-out to all telephone numbers provided to the conference application 210. In another embodiment, the conference application 210 can connect the communication device that initiated the conference call to the conference room 50 and then dial-out to other conference participants. In this embodiment, the communication device that requested the conference call may be a mobile communication device that provided its location to the GTA 30, a communication device monitoring the location of a mobile communication device or a communication device that initiated a dial-by-location conference call.

The conference application 210 can sequentially dial each conference participant or place multiple calls in parallel. That is, instead of calling each participant and waiting for that participant to answer and join the conference call before dialing the next conference participant, the conference application 210 calls all the participants at the same time, and as each participant answers the call, he/she is joined to the conference room 50 for the conference call. The conference application 210 can automatically join each conference participant to the conference call or wait for an acceptance from the conference participant before joining the conference call.

For example, the conference participants dialed out by the conference server 100 may initially receive an interactive voice response (IVR) prompt, such as "You have been invited to a conference call with participant X, please press 1 to join, or press 2 to decline," where participant X is an identifier of the user that initiated the location-based conference call or an identifier of an operator or group associated with the conference call. After receiving this IVR message, each participant who depresses 1 is joined to the conference room 50. All audio associated with each dialed-out leg is preferably muted until the called participant accepts the call by pressing 1. Therefore, other participants already joined to the conference call do not hear distracting superfluous sounds in the conference room 50, such as answering machine prompts, continuous ringing, busy signals, etc.

During the conference call, the conference room 50 operates to mix incoming voice (or Voice over Internet Protocol (VoIP) media streams) received from the conference participants and transmit the mixed media streams back out to the conference participants and provide various data conferencing services to the conference participants during the conference call, such as instant messaging, presentation sharing, desktop sharing and video. The conference room 50 may also implement various policies for managing the conference legs of the conference call, such as muting or un-muting one or more participants and adding and/or dropping one or more participants, based on, for example, a pre-determined time of release, occurrence of an event or action of another participant, etc.

Figure 6:
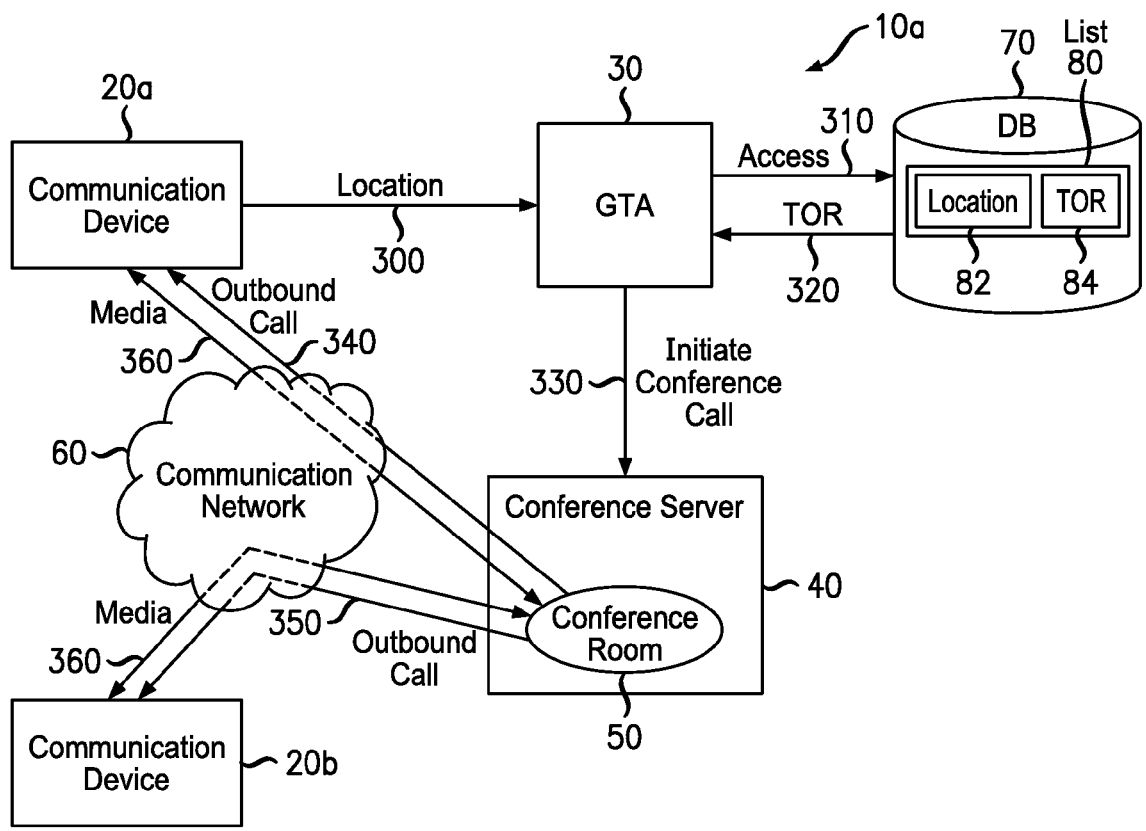
FIG. 6 illustrates an exemplary operation of a static geospatial telephony system, in accordance with embodiments of the present invention.

FIG. 6 illustrates an exemplary operation of a static geospatial telephony system 10*a*, in accordance with embodiments of the present invention. In FIG. 6, at step 300, communication device 20*a* selects and transmits a location to the GTA 30. At steps 310 and 320, the GTA 30 accesses the database 70 to retrieve a telephone number of record (TOR) 84 associated with the location 82. As can be seen in FIG. 6, the database 70 maintains a list 80 of locations 82 and TOR's 84 associated with those locations 82 (i.e., the TOR 84 of a communication device present at a particular location 82). The location 82 can be a specific geographical location (i.e., latitude and longitude coordinates), an address, cross roads, an area, etc.

Upon retrieving the TOR 84 of the location 82 entered by communication device 20*a*, at step 330, the GTA 30 issues API commands to the conference server 40 to initiate a conference call between communication device 20*a* and the communication device having the retrieved TOR 84 (e.g., communication device 20*b*). Upon creating a conference room 50 for the conference call, at step 340, the conference server 40 dials out to communication device 20*a* to connect communication device 20*a* to the conference room 50 via communication network 60. In addition, at step 350, the conference server 40 dials out to communication device 20*b* to connect communication device 20*b* to the conference room 50 via communication network 60. Thereafter, at step 360, media is exchanged between communication device 20*a* and communication device 20*b* via conference room 50 and communication network 60.

Figure 7:
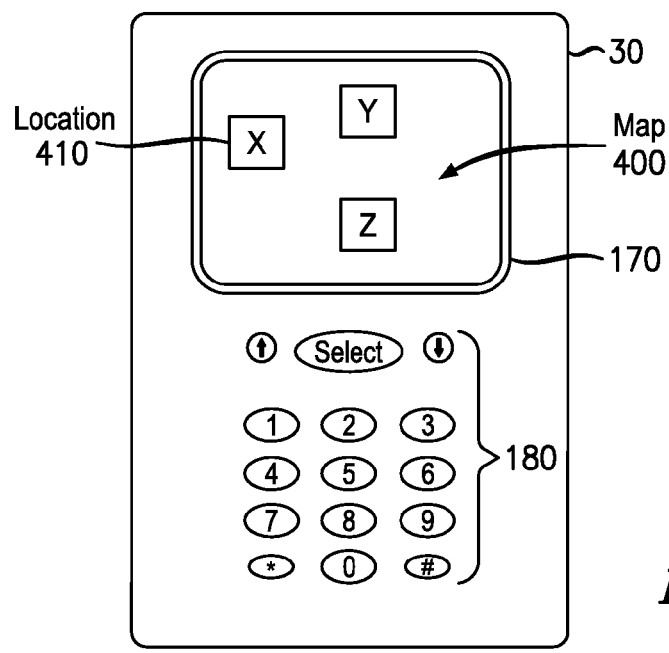
FIG. 7 illustrates an exemplary communication device within the static geospatial telephony system, in accordance with embodiments of the present invention.

FIG. 7 illustrates an exemplary communication device 30 within the static geospatial telephony system, in accordance with embodiments of the present invention. The communication device 30 includes a display 170 and a keypad input device 180. The display 170 and keypad 180 form a graphical user interface that enables a user of the communication device 30 to view a map 400 on the display and select one or more locations 410 on the map 400 for a "dial-by-location" conference call. For example, the user can manipulate arrow/toggle keys or other keys on the keypad 180 to select "Location X" 410 on the map 400 as the location having a communication device positioned thereat that the user would like to initiate a conference call with.

Figure 8A:
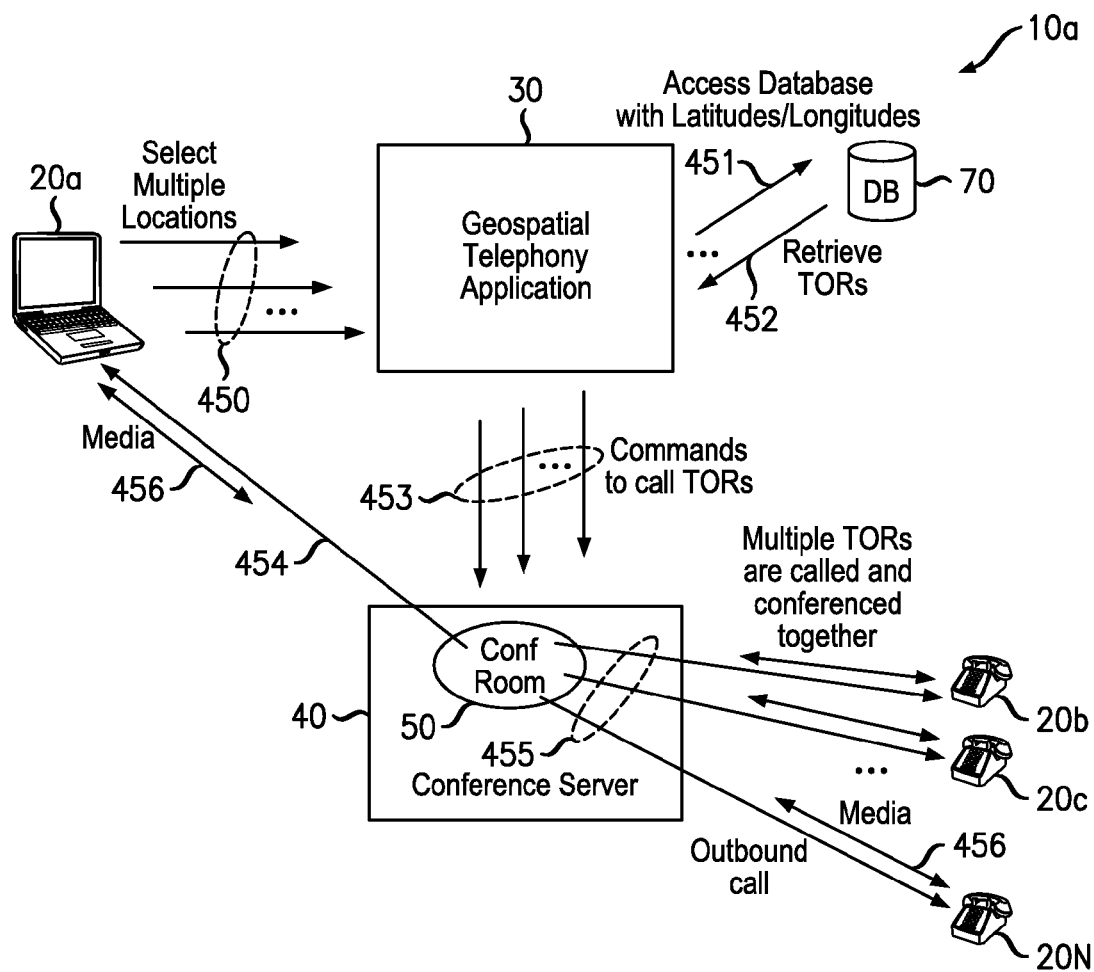
FIGS. 8A-8E illustrate various exemplary call scenarios of the static geospatial telephony system in accordance with embodiments of the present invention.

FIGS. 8A-8E illustrate various exemplary call scenarios of the static geospatial telephony system 10*a* in accordance with embodiments of the present invention. Referring to FIG. 8A, at step 450, a user operating communication device 20*a* can select multiple locations and provide these locations to the GTA 30. As described herein, the GTA 30 may be resident within the communication device 20*a* or within a network node, such as a switch, web server, conference server or other network node, or may be distributed among multiple nodes.

Upon receiving the multiple locations, at steps 451 and 452, the GTA 30 accesses a database 70 with, e.g., each of the location's latitude/longitude, to retrieve the telephone numbers-of-record (TOR) for the locations. Thereafter, in step 453, the GTA 30 generates commands to the conference server 40 to call the TORs and create a conference room 50 for a conference call between communication device 20*a* and communication devices 20*b*, 20*c* . . . 20N having the retrieved TORs. After creating the conference room 50, at step 454, the conference server 40 connects the initiating communication device 20*a* to the conference room 50 by either routing the existing connection from communication device 20*a* to the conference room 50 or dialing out to communication device 20*a*. At step 455, the conference server 40 dials out to the other communication devices 20*b*, 20*c* . . . 20N to connect communication device 20*a* and communication devices 20*b*, 20*c* . . . 20N together in a conference call via conference room 50. Thereafter, at step 456, media is exchanged between communication device 20*a* and communication devices 20*b*, 20*c* . . . 20N via conference room 50.

Figure 8B:
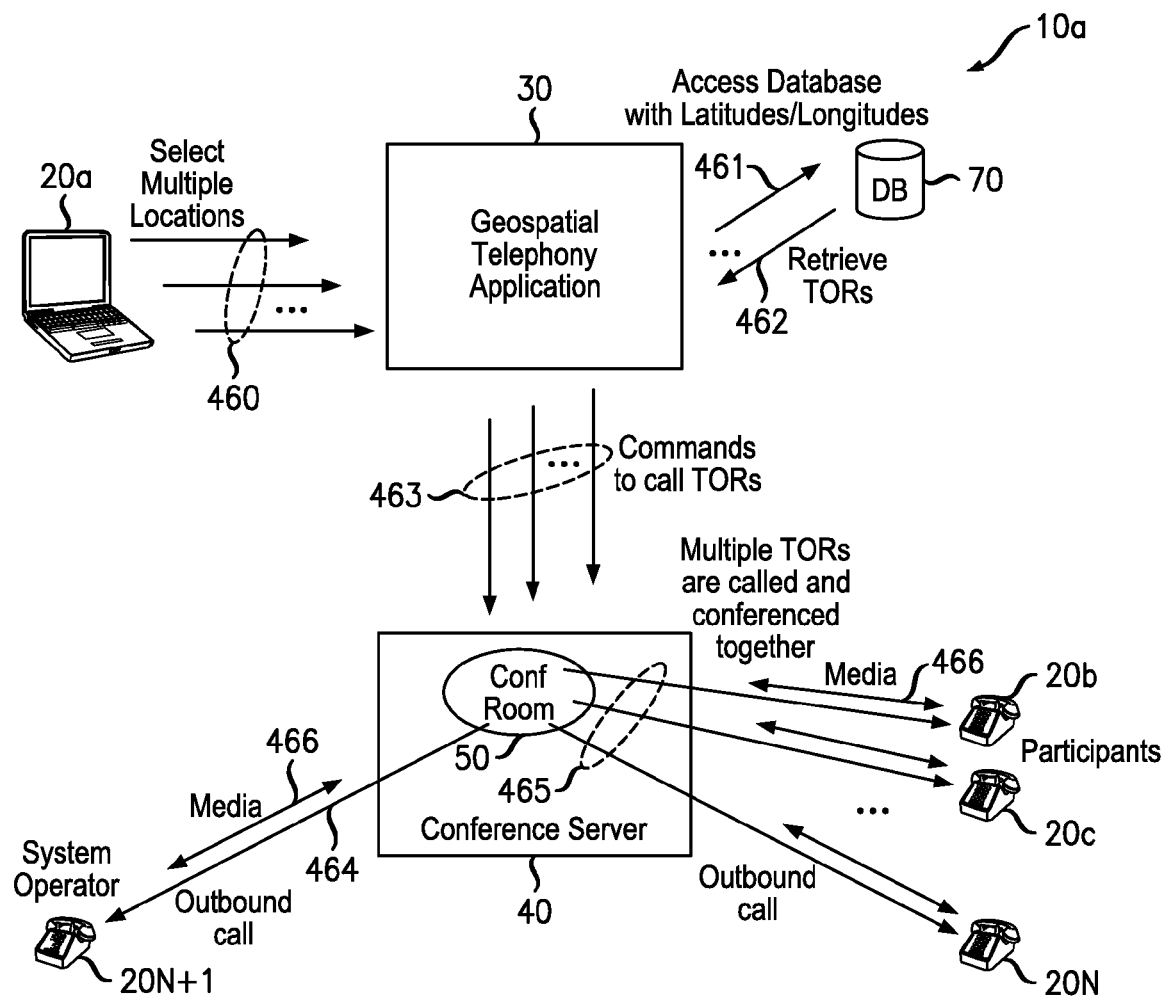

Referring now to FIG. 8B, a system operator might also optionally participate in the multi-party conference call. The operator can greet participants and explain why they are being called. The operator may also state special instructions to the participants, answer questions, and/or otherwise moderate the multi-party conference call, whose participants have been selected based on their geospatial locations. For example, as shown in FIG. 8B, at step 460, a user operating communication device 20*a* can select multiple locations and provide these locations to the GTA 30. In addition, communication device 20*a* can also provide a location and/or TOR of a system operator to be involved in the conference call. Upon receiving the multiple locations, at steps 461 and 462, the GTA 30 accesses the database 70 with each of the locations to retrieve the TORs for the locations.

Thereafter, in step 463, the GTA 30 generates commands to the conference server 40 to call the TORs for the conference participants and system operator and create a conference room 50 for a conference call between communication device 20*a* and communication devices 20*b*, 20*c* . . . 20N and 20N+1 having the TORs. After creating the conference room 50, at step 464, the conference server 40 dials out to the communication device 20N+1 associated with the system operator to connect the system operator to the conference room 50. At step 465, the conference server 40 also dials out to the other conference participant communication devices 20*b*, 20*c* . . . 20N to connect the system operator communication device 20N+1 and the other conference participant communication devices 20*b*, 20*c* . . . 20N together in a conference call via conference room 50. Thereafter, at step 466, media is exchanged between the system operator communication device 20N+1 and the other conference participant communication devices 20*b*, 20*c* . . . 20N via conference room 50.

Figure 8C:
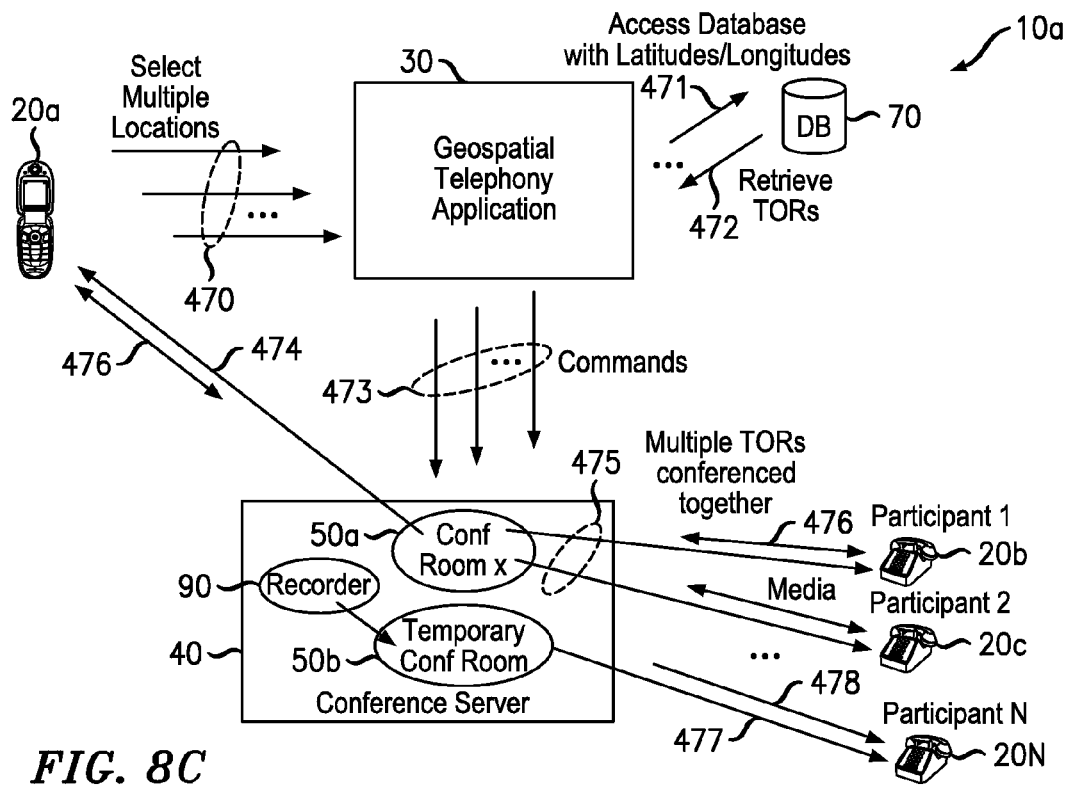

Referring now to FIG. 8C, a recorded voice message stored within a recorder 90 can be played to each participant that conveys information about the nature of the call. After hearing the message, each called-party can opt-in to join the conference, for example, by depressing a specific DTMF key. FIG. 8C depicts the case of two participants (Participant 1 and Participant 2) who have first heard the recorded message and opted-in to join the conference, whereas the Nth participant is hearing the recorded message but has not yet opted-in to join the conference.

In particular, at step 470, a user operating communication device 20*a* selects multiple locations and provides these locations to the GTA 30. Upon receiving the multiple locations, at steps 471 and 472, the GTA 30 accesses the database 70 to retrieve the TORs for the locations. Thereafter, in step 473, the GTA 30 generates commands to the conference server 40 to call the TORs for the conference participants and create a conference room (Conf. Room X) 50*a* for a conference call between communication device 20*a* and communication devices 20*b*, 20*c* . . . 20N having the TORs.

After creating the conference room 50, at step 474, the conference server 40 connects the initiating communication device 20*a* to the conference room 50 by either routing the existing connection from communication device 20*a* to the conference room 50 or dialing out to communication device 20*a*. At step 475, the conference server 40 dials out to Participants 1 and 2, and after playing the recorded message, connects communication devices 20*b* and 20*c* to the conference room 50*a*. Thereafter, at step 476, media is exchanged between communication device 20*a* and communication devices 20*b* and 20*c* via conference room 50*a*. At steps 477 and 478, the conference room 40 dials out to Participant N and connects Participant N to a temporary conference room 50*b* to play the recorded message from recorder 90 to Participant N. If Participant N opts-in to join the conference call, the conference room 40 will subsequently connect communication device 20N to conference room 50*a*.

Figure 8D:
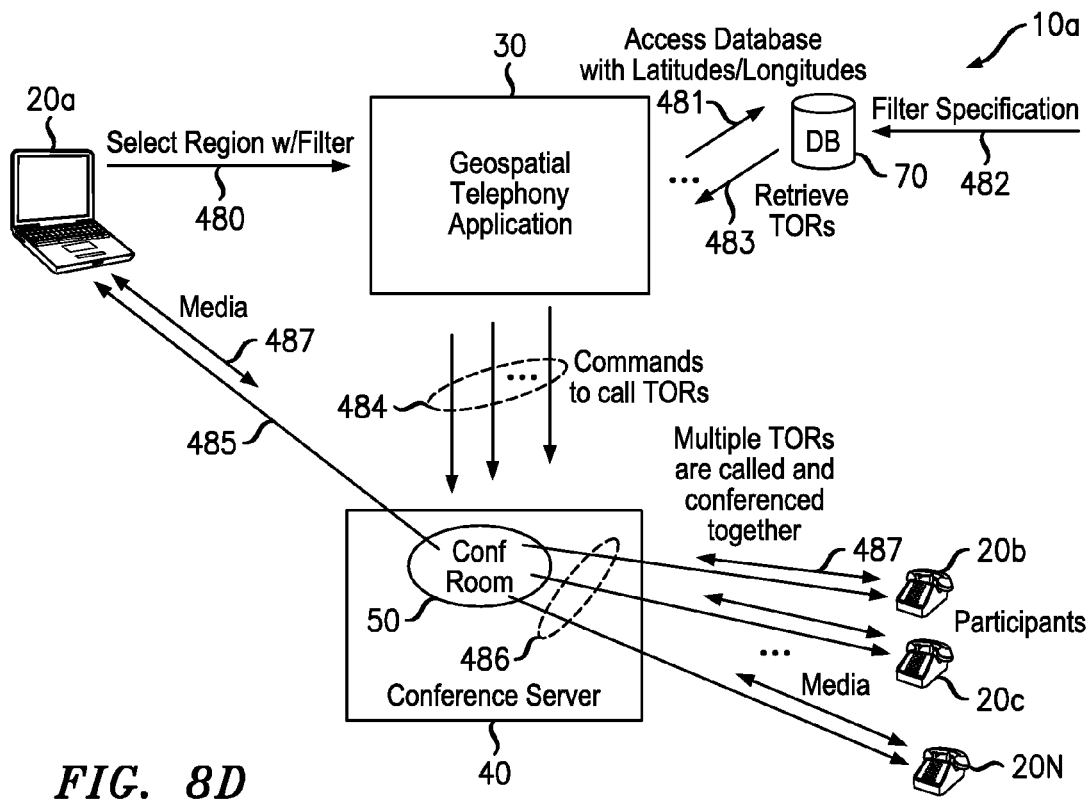

Referring now to FIG. 8D, in another embodiment, instead of selecting multiple distinct locations on a map, an entire geospatial region can be selected, and TORs within this region are called and optionally conferenced together. The selection could be performed, for example, by circling a region on a map using a PC's mouse. In addition, a filter can be applied to the database query so that only certain TORs within the region are selected. For example, if the filter is "schools", all TORs for schools in the encircled or selected region are called and optionally conferenced together. Similarly, if the filter is "mayor-offices", or "police-stations", only those multiple mayor-offices or police-stations within the specified region would be called and conferenced together.

In particular, at step 480, a user operating communication device 20*a* selects a geospatial region and provides this region and an optional filter to the GTA 30. Upon receiving the region and filter, at steps 481-483, the GTA 30 accesses the database 70 to retrieve the TORs for the region that match the filter specification. Thereafter, in step 484, the GTA 30 generates commands to the conference server 40 to call the TORs for the conference participants and create a conference room 50 for a conference call between communication device 20*a* and communication devices 20*b*, 20*c* . . . 20N having the TORs.

After creating the conference room 50, at step 485, the conference server 40 connects the initiating communication device 20*a* to the conference room 50 by either routing the existing connection from communication device 20*a* to the conference room 50 or dialing out to communication device 20*a*. At step 486, the conference server 40 dials out to the other conference participants to connect communication devices 20*b*, 20*c* . . . 20N to the conference room 50. Thereafter, at step 487, media is exchanged between communication device 20*a* and communication devices 20*b*, 20*c* . . . 20N via conference room 50.

Figure 8E:
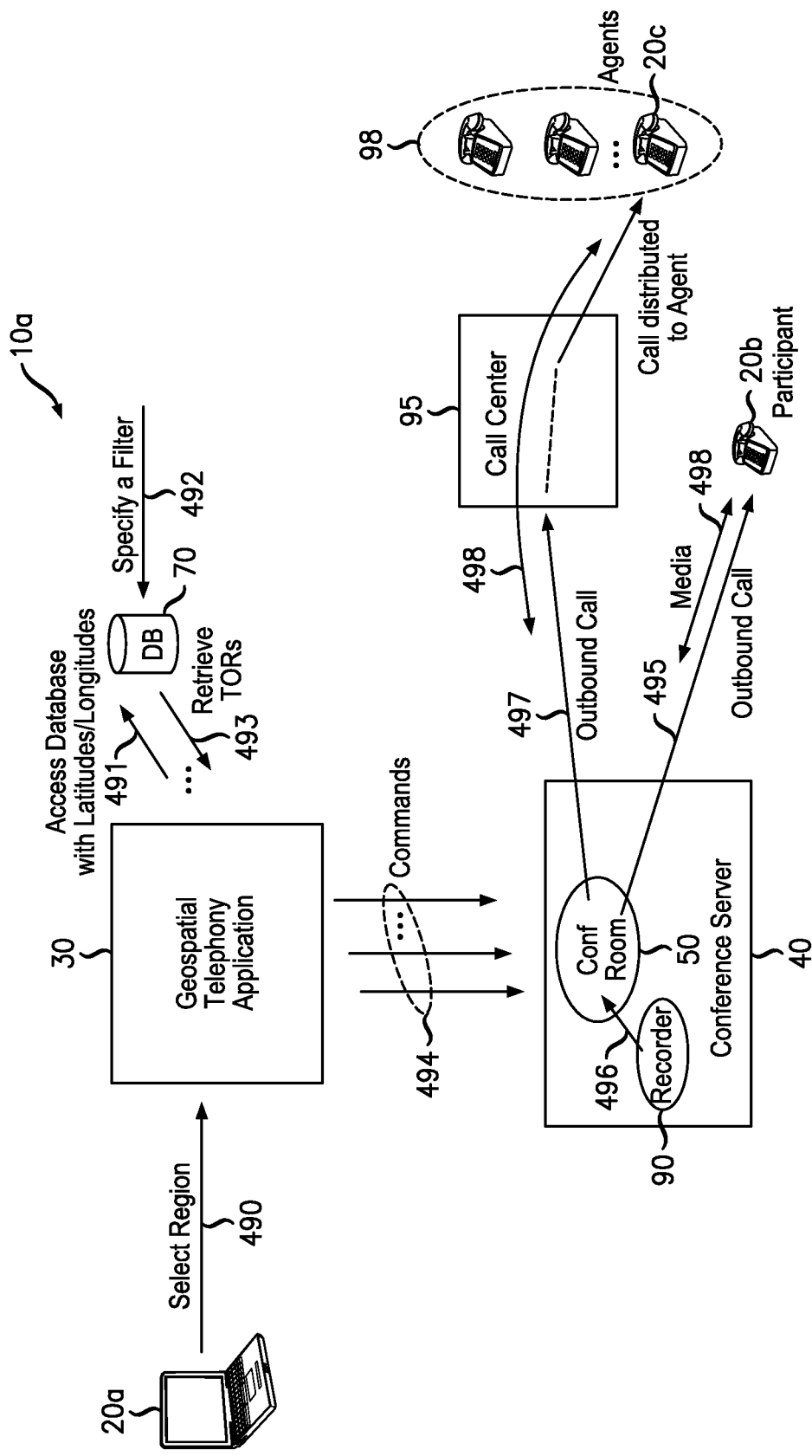

Referring now to FIG. 8E, the static geospatial telephony system (SGTS) 10*a* can be used to conduct geospatial campaigns or announce geospatial messages. In this embodiment, the SGTS can set up an outbound call to each participant and play a recorded voice message. After the participant opts-in, the conference server 40 can setup another leg to a call center 95, and this leg is then routed to the next available agent 98.

For example, the SGTS 10*a* can issue a message to all TORs in a selected region. Each participant can be called, hear the message, and optionally opt-in to be connected to a call center 95 to ask questions and interact with the next-available call center agent 98, who is familiar with the details of the call and who can address questions and concerns. Other example usage cases include political campaigns, emergency public warning systems and other community announcements (i.e., Home Owner's Association, Neighborhood Watch, school messages, etc.).

In particular, at step 490, a user operating communication device 20*a* selects a geospatial region for an announcement and provides this region and an optional filter to the GTA 30. Upon receiving the region and filter, at steps 491-493, the GTA 30 accesses the database 70 to retrieve the TORs for the region that match the filter specification. Thereafter, in step 494, the GTA 30 generates commands to the conference server 40 to call the TORs for the conference participants and create a separate conference room 50 for each TOR to enable separate conference calls to be established between each conference participant having one of the TOR's and a recorder 90.

For example, as shown in FIG. 8E, the conference server 40 creates a conference room 50 for a particular participant, and after creating the conference room 50, at step 495, the conference server 40 dials out to communication device 20b associated with that participant to connect communication device 20b to the conference room 50. Thereafter, at step 496, the recorder 90 plays a recorded message to communication device 20b. If, after hearing the message, the participant associated with communication device 20b desires to speak to an agent regarding the message, that participant can opt-in to join a conference call with a call center agent 98. Then, at step 497, the conference server 40 can dial out to the call center 95 to connect communication device 20c associated with one of the call center agents 98 to the conference room 50. Thereafter, at step 498, media is exchanged between communication device 20b and communication device 20c via conference room 50.

Figure 9:
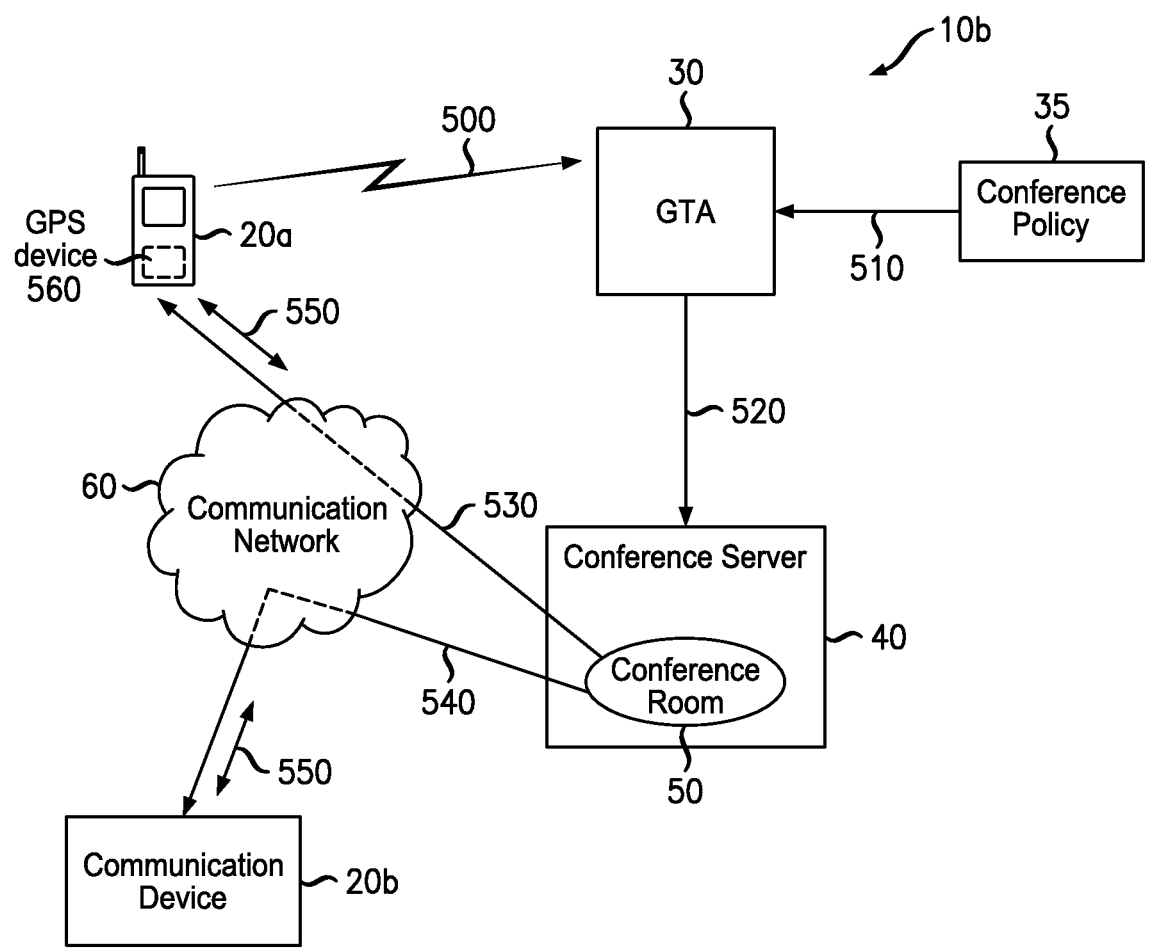
FIG. 9 illustrates an exemplary operation of a dynamic geospatial telephony system, in accordance with embodiments of the present invention.

FIG. 9 illustrates an exemplary operation of a dynamic geospatial telephony system 10b, in accordance with embodiments of the present invention. The dynamic geospatial telephony system 10b includes a communication device 20a, whose location indicates whether or not a conference call should be initiated. In FIG. 9, the communication device 20a is a mobile communication device, such as a cell phone, that has a GPS device 560 therein to determine the location (latitude and longitude) of the communication device 20a. In other embodiments, the location of the communication device 20a can be determined using a different internal positioning technique or by the network.

At step 500, the communication device 20a transmits its location to the GTA 30. In other embodiments, the location of the communication device 20a can be sent to the GTA by the network. Upon receiving the location, at step 510, the GTA 30 reviews a conference policy 35 associated with communication device 20a to determine whether a conference call should be initiated based on the location of the communication device 20a. The conference policy 35 may be predefined or received from one of the conference participants and identifies one or more conference participants to include in the conference call based on the location of the communication device 20a. For example, the conference policy 35 may indicate that when the communication device 20a arrives at a particular location, a conference call should be established between communication device 20a and another communication device 20b. The conference policy 35 may be associated with a particular communication device (i.e., communication device 20a) or may be associated with a particular location and/or geographic region/area.

If the conference policy 35 indicates that a conference call between communication device 20 and communication device 20b should be established based on the location of communication device 20a, at step 520, the GTA 30 issues API commands to the conference server 40 to initiate a conference call between communication device 20a and communication device 20b. Upon creating a conference room 50 for the conference call, at step 530, the conference server 40 dials out to communication device 20a to connect communication device 20a to the conference room 50 via communication network 60. In addition, at step 540, the conference server 40 dials out to communication device 20b to connect communication device 20b to the conference room 50 via communication network 60. Thereafter, at step 550, media is exchanged between communication device 20a and communication device 20b via conference room 50 and communication network 60.

Figure 10A:
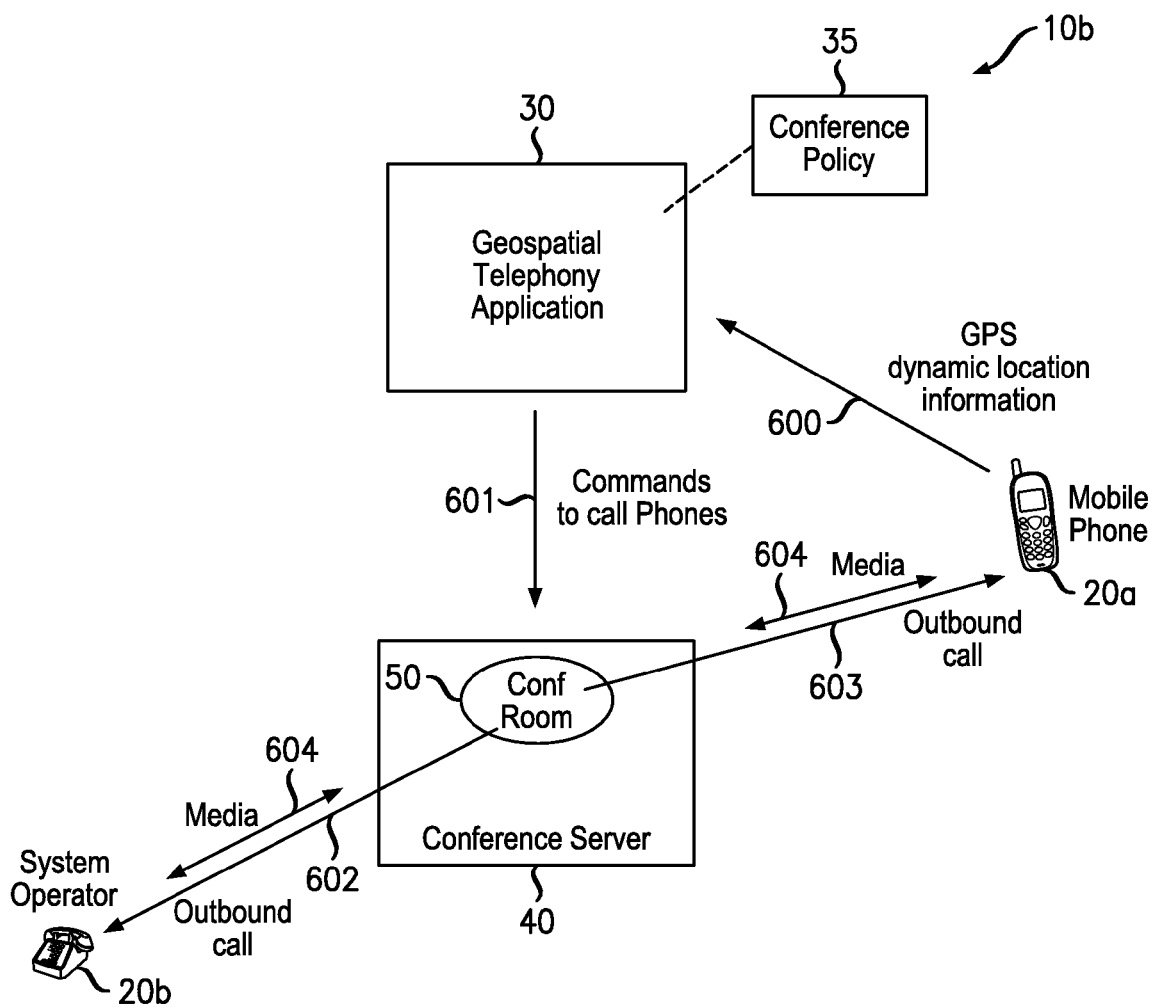
FIGS. 10A-10D illustrate various exemplary call scenarios of the dynamic geospatial telephony system in accordance with embodiments of the present invention.

FIGS. 10A-10D illustrate various exemplary call scenarios of the dynamic geospatial telephony system 10b in accordance with embodiments of the present invention. Referring now to FIG. 10A, when a mobile phone 20a initially enters a certain geospatial region or location, the Dynamic Geospatial Telephony System (DGTS) 10b can cause the mobile phone 20a to be placed in a two-party call with a system operator. An example usage case is a delivery service context, in which the operator might tell the delivery-person where delivery stop N+1 is, as soon as that delivery-person is located nearby delivery stop N. Another example usage case is an emergency scenario, in which the conference might be established when the mobile phone, located in an ambulance, fire-truck or other emergency vehicle, initially enters the geographical region nearby the scene of the emergency to talk with the incident commander. Other example usages include service vehicles, taxicabs, tracking and/or monitoring services and other similar such services.

In particular, at step 600, the mobile phone 20a transmits its GPS dynamic location information to the GTA 30. The GTA 30 accesses the conference policy 35 for the mobile phone 20a and determines that, based on the location of the mobile phone 20a, a conference call should be established between mobile phone 20a and communication device 20b associated with a system operator. Thereafter, in step 601, the GTA 30 generates commands to the conference server 40 to create a conference room 50 for a conference call between mobile phone 20a and communication device 20b.

After creating the conference room 50, at step 602, the conference server 40 dials out to communication device 20b to connect communication device 20b to the conference room 50. Thereafter, at step 603, the conference server 40 connects mobile phone 20a to the conference room 50 by either routing the existing connection from mobile phone 20a to the conference room 50 or dialing out to mobile phone 20a. At step 604, media is exchanged between mobile phone 20a and communication device 20b via conference room 50.

Figure 10B:
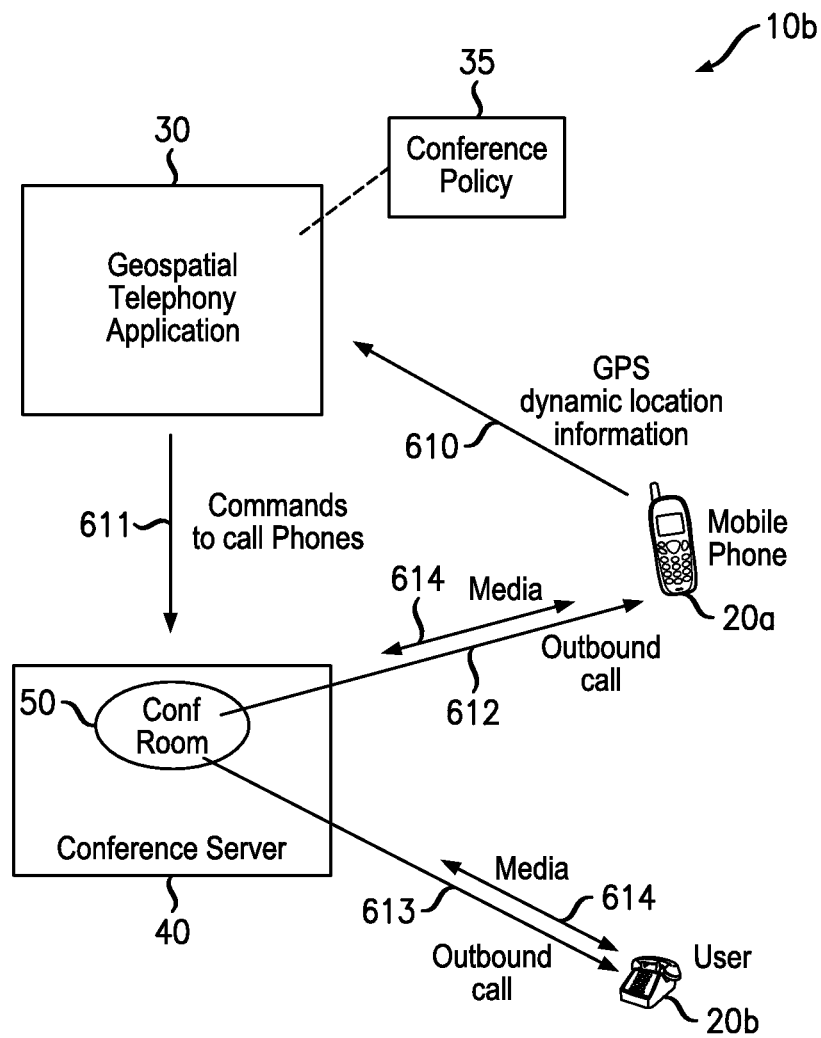

Referring now to FIG. 10B, in an exemplary embodiment, when the mobile phone 20a enters a certain geographic area, the mobile phone 20a and another communication device 20b can be placed together in a two-party voice conference. For example, in a delivery or home-service context, the mobile phone 20a may automatically be placed in a two-party call with a customer having a telephone number on a list associated with stop N+1, now that the delivery or service person enters (or exits) the geospatial region nearby stop N. During the call, the delivery or service-person could tell the customer his/her home or office will be the next stop and provide an estimate of the time of arrival of the delivery.

In particular, at step 610, the mobile phone 20a transmits its GPS dynamic location information to the GTA 30. The GTA 30 accesses the conference policy 35 for the mobile phone 20a and determines that, based on the location of the mobile phone 20a, a conference call should be established between mobile phone 20a and communication device 20b associated with a particular user/customer. Thereafter, in step 611, the GTA 30 generates commands to the conference server 40 to create a conference room 50 for a conference call between mobile phone 20a and communication device 20b.

After creating the conference room 50, at step 612, the conference server 40 connects mobile phone 20a to the conference room 50 by either routing the existing connection from communication device 20*a* to the conference room 50 or dialing out to communication device 20*a*. Thereafter, at step 613, the conference server 40 dials out to communication device 20*b* to connect communication device 20*b* to the conference room 50. At step 604, media is exchanged between mobile phone 20*a* and communication device 20*b* via conference room 50.

Figure 10C:
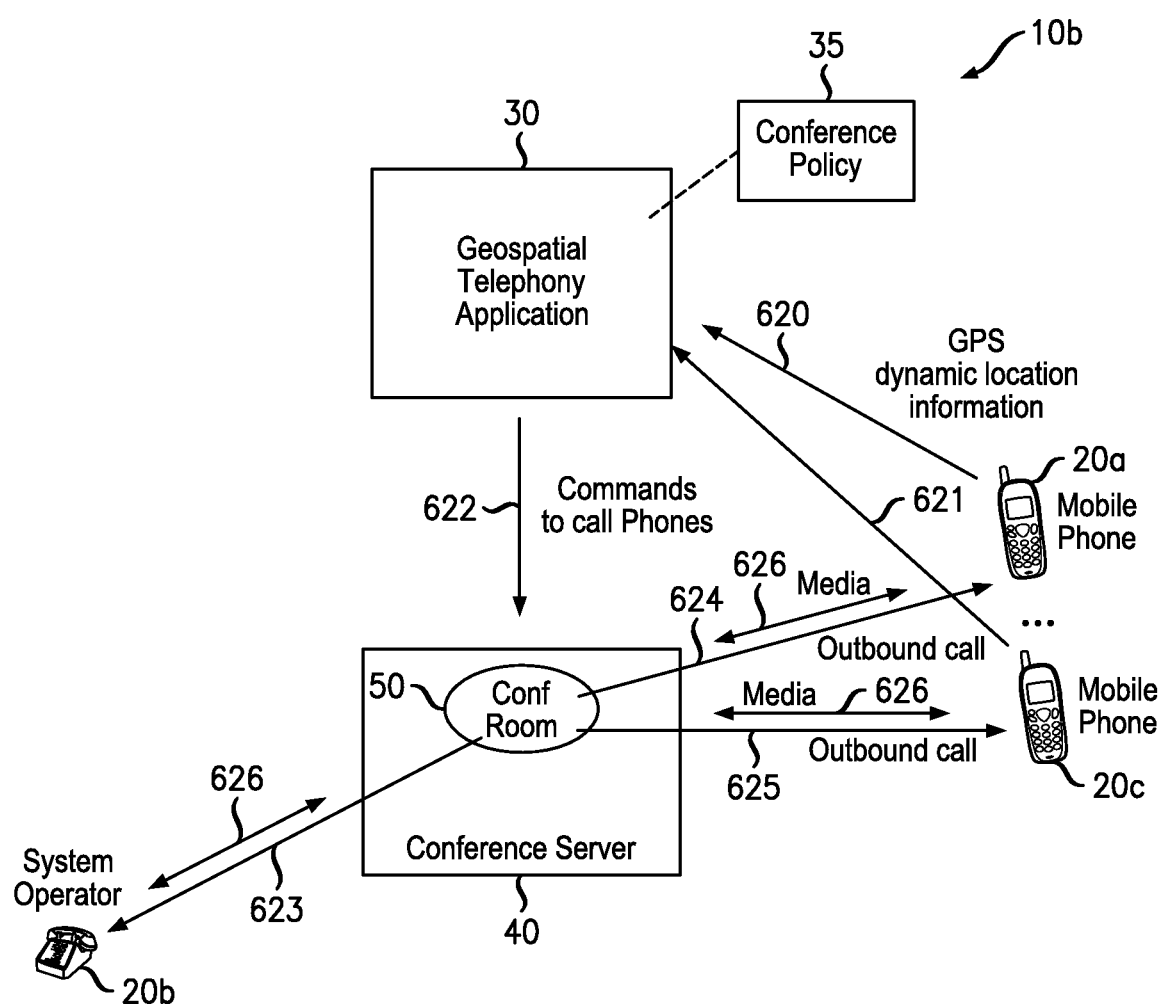

Referring now to FIG. 10C, the DGTS 10*b* can also join multiple phones together in a voice conference dependent on their locations. For example, each mobile phone can be automatically joined to a conference, as they arrive nearby a location, such as an emergency site. In one embodiment, the mobile phones are joined one-by-one as they enter a particular geospatial region. In another embodiment, the DGTS 10*b* waits until a certain number or all of the mobile phones are present in the geospatial region before conferencing them together. An operator may optionally be present in the conference to coordinate the call, issue instructions, etc.

In particular, at steps 620 and 621, mobile phones 20*a* and 20*c* transmit their GPS dynamic location information to the GTA 30. The GTA 30 accesses the conference policies 35 for mobile phone 20*a* and 20*c* and determines that, based on the locations of mobile phones 20*a* and 20*c*, a conference call should be established between mobile phone 20*a*, mobile phone 20*c* and communication device 20*b* associated with a system operator. Thereafter, in step 622, the GTA 30 generates commands to the conference server 40 to create a conference room 50 for a conference call between mobile phone 20*a*, mobile phone 20*c* and communication device 20*b*.

After creating the conference room 50, at step 623, the conference server 40 dials out to communication device 20*b* to connect communication device 20*b* to the conference room 50. Thereafter, at steps 624 and 625, the conference server 40 connects mobile phones 20*a* and 20*c* to the conference room 50 by either routing the existing connection from mobile phones 20*a* and 20*c* to the conference room 50 or dialing out to mobile phones 20*a* and 20*c*, the latter being illustrated. At step 626, media is exchanged between mobile phone 20*a*, mobile phone 20*c* and communication device 20*b* via conference room 50.

Figure 10D:
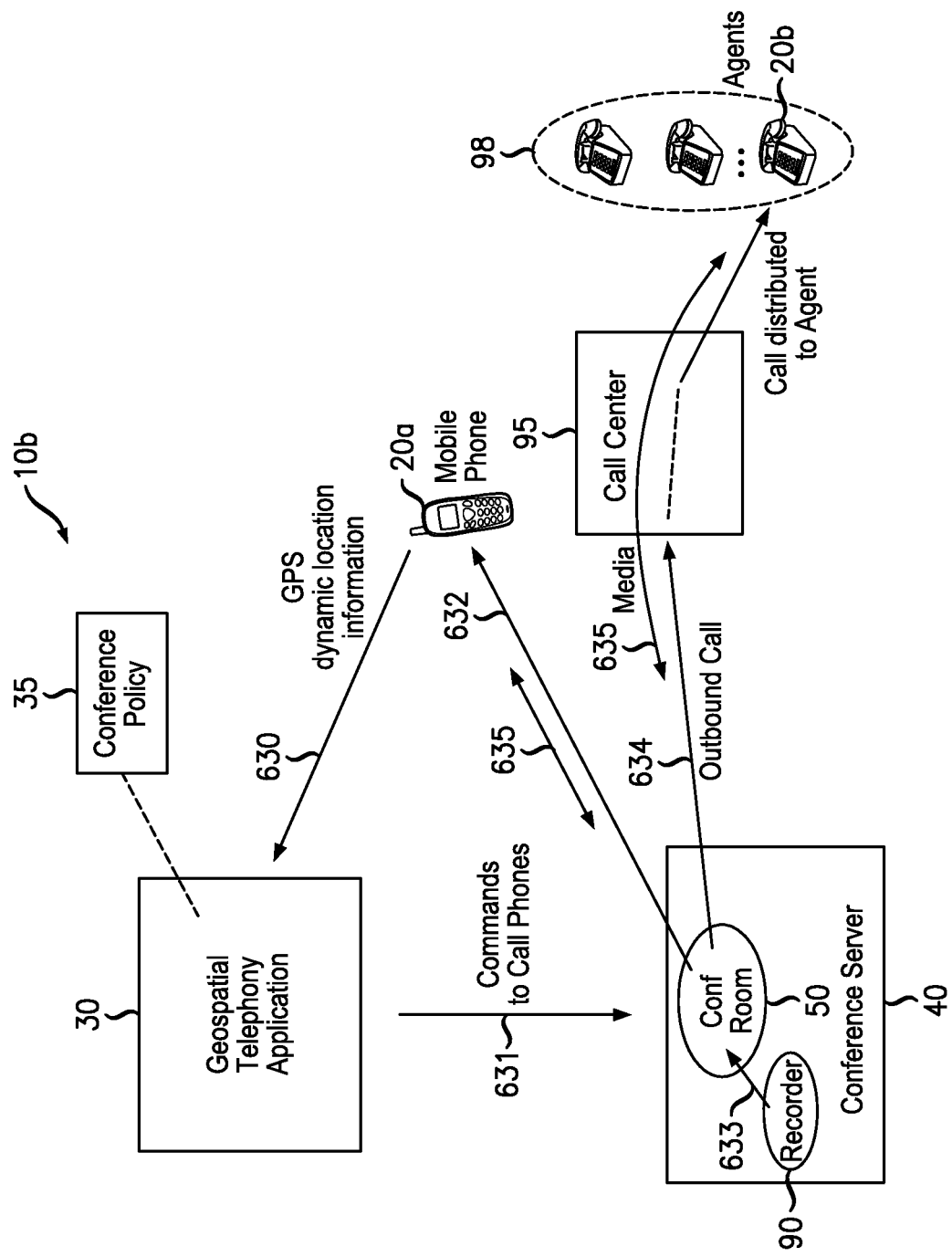

Referring now to FIG. 10D, the DGTS 10*b* can also be used as an emergency warning system for all mobile phones within a particular region. For example, in a hurricane evacuation scenario, all mobile phones located along a certain section of a highway might be called and instructed to exit the highway at a certain exit. In this application, the DGTS 10*b* would call a large number of mobile phones, selected based on their geospatial location, and play a recorded message. The DGTS 10*b* may also optionally allow each mobile phone user to be connected to a call center agent who can have a two-way conversation with each mobile phone user to answer questions and to provide additional interactive instructions, etc.

In particular, at step 630, the mobile phone 20*a* transmits its GPS dynamic location information to the GTA 30. The GTA 30 accesses a conference policy 35 associated with the mobile phone location (e.g., the conference policy 35 can be associated with the exact location or with a region/area within which the location is found) and determines that, based on the location of the mobile phone 20*a*, a conference call should be established with mobile phone 20*a* to play an announcement. Thereafter, in step 631, the GTA 30 generates commands to the conference server 40 create a conference room 50 for a conference call between mobile phone 20*a* and recorder 90. It should be noted that if multiple mobile phones need to be placed in conference calls to hear the recorded message, separate conference rooms can be created for each conference call to enable all mobile phones to hear the complete recorded message immediately upon joining their respective conference rooms.

For example, as shown in FIG. 10D, the conference server 40 creates a conference room 50 for mobile phone 20*a*, and after creating the conference room 50, at step 632, the conference server 40 dials out to mobile phone 20*a* to connect mobile phone 20*a* to the conference room 50. Thereafter, at step 633, the recorder 90 plays a recorded message to communication device 20*a*. If, after hearing the message, the participant associated with mobile phone 20*a* desires to speak to an agent regarding the message, that participant can opt-in to join a conference call with a call center agent 98. Then, at step 634, the conference server 40 can dial out to the call center 95 to connect communication device 20*b* associated with one of the call center agents 98 to the conference room 50. Thereafter, at step 635, media is exchanged between communication device 20*b* and mobile phone 20*a* via conference room 50.

Figure 11:
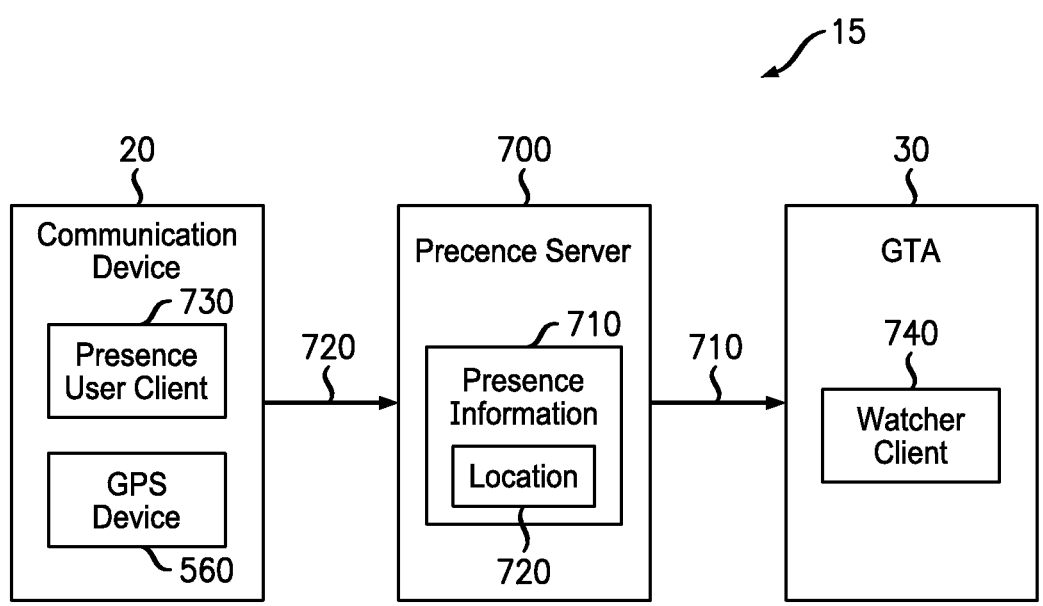
FIG. 11 illustrates a geospatial telephony system incorporating a presence system, in accordance with embodiments of the present invention.

FIG. 11 illustrates a geospatial telephony system incorporating a presence system 15, in accordance with embodiments of the present invention. The presence system 15 enables the GTA 30 to receive the location of a mobile communication device 20 indirectly (e.g., through the presence system 15). As such, the mobile communication device 20 does not need to include a separate application to transmit its location to the GTA 30.

The presence system 15 includes a presence server 700 maintaining presence information 710 on a presentity. As used herein, the term "presence information" refers to the real-time status of a presentity. For example, such presence information can include the availability, activity, location, current status of the active devices/applications and the corresponding preferences. In addition, as used herein, the term "presentity" refers to a user (person) associated with one or more communication devices.

An example of a mobile communication device of a presentity is shown in FIG. 11. The mobile communication device 20 includes a presence user client 730 and a GPS device 560. The presence user client 730 and GPS device 560 each include any necessary hardware, software and/or firmware for performing the functions described herein. For example, the GPS device 560 can operate to determine the location 720 (GPS coordinates) of the mobile communication device 20, while the presence user client 730 can operate to retrieve/receive the location 720 of the mobile communication device 20 from the GPS device 560 and to transmit the location 720 to the presence server 700 as presence information 710 of the presentity.

To facilitate the transmission of the location 720 of the mobile communication device 20 to the GTA 30, the GTA 30 includes a watcher client 740 that communicates with the presence server 700. For example, the GTA 30 can include an API to the presence server 700 that enables the GTA 30 to receive each new updated location 720 of the mobile communication device 20. The GTA can register with the presence server 700 as a watcher of the presentity associated with the mobile communication device 20 and can set filters (preference information) with the presence server 700 to receive each new updated location 720 of the mobile communication device 20.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

The invention claimed is:

1. A node within a geospatial telephony system and coupled to a communication network that allows for the automatic initiation of a conference call between conference participants based on the location of at least one of the participants, the node comprising:
   a memory for storing a geospatial telephony application; and
   a processor operable to execute instructions of the geospatial telephony application to receive a location at which a first communication device is geospatially located from a second communication device, access a database to retrieve a telephone number of record of the first communication device and enable a conference call to be initiated between the first communication device and at least the second communication device based on the location.

2. The node of claim 1, wherein:
   the processor is operable to receive a plurality of locations, each having a different one of a plurality of communication devices geospatially positioned thereat; and
   the processor is further operable to enable the conference call to be initiated between the second communication device and the plurality of communication devices.

3. The node of claim 1, wherein:
   the location includes a geographic region; and
   the processor is further operable to access the database to retrieve multiple telephone numbers of record for multiple communication devices that are geospatially positioned within the geographic region for the conference call.

4. The node of claim 3, wherein:
   the location further includes a filter; and
   the processor is further operable to select specific ones of the multiple telephone numbers of record based on the filter for the conference call.

5. The node of claim 1, wherein the first communication device is a mobile communication device.

6. The node of claim 1, wherein the node is one of the first communication device and another communication device associated with the conference call.

7. The node of claim 1, wherein the node is a switch within the communication network and coupled to a conference server to facilitate the conference call between the first communication device and at least the second communication device.

8. The node of claim 1, wherein the node is a web server hosting a website controlled by the processor.

9. The node of claim 8, wherein the processor is operable to push a web page to the second communication device to enable a user of the second communication device to enter the location.

10. A geospatial telephony system that allows for the automatic initiation of a conference call between conference participants based on the location of at least one of the participants, the system comprising:
    a node coupled to a communication network to receive a location at which a first communication device is geospatially located from a second communication device, access a database to retrieve a telephone number of record of the first communication device and enable a conference call to be initiated between the first communication device and at least the second communication device based on the location; and
    a conference server including a conference room operable to manage the conference call, the conference server operable to create the conference room and to connect the first communication device and at least the second communication device together in the conference call via the conference room.

11. The system of claim 10, wherein the conference server further creates a temporary conference room to connect the first communication device and at least the second communication device to a recorder to play a recorded message that prompts each of the first communication device and at least the second communication device to opt-in to join the conference call.

12. The system of claim 10, further comprising:
    a call center coupled to a plurality of call center agents, one of the call center agents being associated with the first communication device or the second communication device.

13. The system of claim 10, wherein:
    the node is operable to receive a plurality of locations, each having a different one of a plurality of communication devices geospatially positioned thereat; and
    the node is further operable to enable the conference call to be initiated between the second communication device and the plurality of communication devices.

14. The system of claim 10, wherein:
    the location includes a geographic region; and
    the node is further operable to access the database to retrieve multiple telephone numbers of record for multiple communication devices that are geospatially positioned within the geographic region for the conference call.

15. The system of claim 14, wherein:
    the location further includes a filter; and
    the node is further operable to select specific ones of the multiple telephone numbers of record based on the filter for the conference call.

16. The system of claim 10, wherein the first communication device is a mobile communication device.

17. The system of claim 10, wherein the node is one of the first communication device and another communication device associated with the conference call.

18. The system of claim 10, wherein the node is a switch within the communication network and coupled to the conference server to facilitate the conference call between the first communication device and at least the second communication device.

19. The system of claim 10, wherein the node is a web server hosting a website.

20. The system of claim 14, wherein the web site is operable to push a web page to the second communication device to enable a user of the second communication device to enter the location.

* * * * *